2,842,583

PROCESS FOR PREPARING 1,3-BIS (DIMETHYL-THIOCARBAMYL-MERCAPTOMETHYL)-UREA

Walter C. Meuly, Mill Creek Hundred, Del., assignor to E. I. du Pont de Nemours and Company, Wilmington, Del., a corporation of Delaware No Drawing. Application August 4, 1955
Serial No. 526,571

7 Claims. (Cl. 260—455)

1,3-bis(dimethylthiocarbamyl-mercaptomethyl)-urea is a valuable vulcanizing agent, and it also possesses useful anti-bacterial, disinfectant and rodent repellent powers.

My present invention has as one of its objects to provide an improved process for preparing 1,3-bis(dimethylthiocarbamyl-mercaptomethyl)-urea, whereby to obtain the same in good yield and in a state of high purity. Various additional objects and achievements of this invention will appear as the description proceeds.

It has been known that the mentioned compound may be synthesized by reacting one mole of dimethylol urea with two moles of dimethyl-dithiocarbamic acid in aqueous medium, followed by cooling to precipitate out the product. The latter, however, is not pure and its yield is very low (customarily, of the order of 17% of theory). The product cannot readily be purified, and when used in soap or similar detergents it develops objectionable odors in these upon aging.

Now according to my present invention, the mentioned compound may be obtained in nearly theoretical yield and in an exceptionally high state of purity by reacting together urea, formaldehyde, dimethylamine and carbon disulfide, in essentially stoichiometrical proportions, provided care is taken to avoid or minimize formation of dimethylol urea as an intermediate product. This latter effect may be achieved by selecting the steps of intermixing the materials, so as to avoid contact between urea and unreacted formaldehyde, except in the presence of at least one of the other reactants involved in this reaction, namely carbon disulfide, dimethylamine or their intermediate reaction product. The reaction is preferably carried out at a temperature in the range of 0° to 60° C. Apparently, the interaction of urea with formaldehyde is much slower than the reaction of formaldehyde with the other constituents of the reaction mass. But I do not wish to limit my invention to any particular theory, inasmuch as I find by observation that, regardless of the order of mixing the mentioned four reactants, the yield of the final product and its purity are high if the reaction mass is maintained at a temperature not exceeding 60° C. and if said principal condition concerning intermixing has been observed.

The reaction is preferably effected in an aqueous medium which may consist of water alone or of a mixture of water with one or more water-miscible organic solvents, for instance acetone.

I also find that in lieu of dimethylamine and carbon disulfide, as separate entities, one may also employ water-soluble salts of dimethyl dithiocarbamic acid, for instance an alkali-metal salt, in which case controlled amounts of a relatively weak organic or inorganic acid, such as acetic, tartaric, formic, citric or boric, is added to convert the salt into the corresponding acid. The dimethylammonium salt of dimethyl-dithiocarbamic acid is another illustration of a water-soluble salt that may be employed. This salt is readily formed, together with an excess of $CS_2$, when equimolecular proportions of dimethylamine and carbon disulfide are brought together in aqueous medium at room temperature. When this intermediate reaction mass is used in the process of this invention, the addition of acid may be dispensed with.

Other equivalent modifications of the basic process above indicated will be readily apparent, except for starting with dimethylol urea, as already explained.

Without limiting my invention, the following examples are given to illustrate my preferred mode of operation. Parts mentioned are by weight.

Example 1

143 parts of sodium dimethyldithiocarbamate (1 mole), 33 parts of urea (0.5 mole), and 33 parts of formaldehyde (1.1 moles) as a 37% aqueous solution were mixed at room temperature with 400 parts of water. While agitating the mixture at 20 to 40° C., 60 parts of dilute acetic acid (1 mole) were slowly added, keeping the reaction mixture above pH 7 at all times. A white finely divided precipitate gradually formed. It was filtered off, washed with warm water and then with acetone. In this way 148 parts of chalk-white, crystalline product were obtained which melted at 145 to 147° C., and had the following elemental analysis: N: 17.0%; S: 39.7%; C: 33.15%; H: 5.52%.

Example 2.—($Amine+urea+CH_2O+CS_2$)

90 parts dimethylamine (2 moles) in the form of 225 parts of 40% aqueous solution were dissolved in 300 parts acetone. 63 parts urea (1.05 moles) were added and after being dissolved, there were added to the solution over a period of one-half hour 63 parts formaldehyde (2.1 moles) in the form of 170.3 parts 37% commercial aqueous solution. The temperature of the resulting solution rose from 20° to 28° C. during the addition. 152 parts carbon disulfide (2 moles) were added during the next half hour and the temperature was permitted to rise to 35° C. After about one-half of the carbon disulfide had been added a white sandy precipitate began to form which increased rapidly. The reaction mass was held for 4 hours at a temperature that increased gradually from 35° to 45° C. The white crystalline slurry was filtered off and the cake was washed with 50% aqueous acetone until the filtrate was colorless. 303 parts of a white product were obtained, which is equal to 93% of the theoretical amount. Melting range=145 to 147° C.

Example 3

The 300 parts of acetone in Example 2 were replaced by 300 parts of water and the reaction carried out identically. The reaction yielded 313 parts of product melting at 146° to 147° C. was obtained.

Example 4.—($Amine+CS_2+urea+CH_2O$)

90 parts dimethylamine (2 moles) in the form of 225 parts 40% aqueous solution were dissolved in 300 parts of acetone. 152 parts carbon disulfide (2 moles) were added at a temperature of 20 to 25° C. The addition proceeded with the liberation of heat and it may be assumed that the reaction mass contained dimethyl ammonium dimethyl dithiocarbamate and excess carbon disulfide. To this solution were added 60 parts of urea (1 mole) and stirred to dissolve. 60 parts formaldehyde (2 moles) in the form of 162 parts commercial 37% solution were added gradually during one-half hour at 10° C. The solution became turbid and a white precipitate started to form after 2 hours. The mass was kept for 24 hours at 25° C. and finally warmed to 45° C. and filtered. The product was similar in yield and quality to the product of Example 2.

Example 5.—($Urea+CH_2O+CS_2+amine$)

A solution was prepared by dissolving at room temperature in 300 parts of acetone, 60 parts urea (1 mole), 152 parts carbon disulfide (2 moles) and 60 parts formaldehyde (2 moles) in the form of 162 parts commercial 37% solution. No evidence of reaction was noticed. 90 parts of dimethylamine (2 moles) in the form of 225 parts 40% aqueous solution were added gradually and with cooling to 10° C. When all had been added the solution had become turbid and after 24 hours at 25° C. a white precipitate had formed. After isolation as in Example 2 there were obtained 284 parts of product, having a melting range of 143° to 145° C.

*Example 6*

When stoichiometric amounts of urea and dimethylamine were dissolved in aqueous acetone at room temperature and stoichiometric amounts of $CS_2$ and 37% aqueous formaldehyde added to the solution while stirring over ¾ hour, an 80% yield of 1,3-bis(dimethylthiocarbamylmercaptomethyl)urea was obtained, M. P. 143 to 146° C.

*Example 7*

30 parts of urea were dissolved in 45.1 parts of dimethylamine, which was in the form of a commercial 25% aqueous solution. 30 parts of formaldehyde, in the form of a commercial 37% solution, were added, followed by 78 parts of carbon disulfide. The last two compounds were added gradually and the mass was maintained at room temperature for a period of 12 to 24 hours. The reaction mass which had by this time become a white paste, was filtered off and washed as indicated in Example 6. A product identical with the product of Example 6 was obtained, in excellent yield and purity.

*Example 8.—(Amine $+CS_2+CH_2O+$urea)*

90 parts dimethylamine (2 moles) in the form of 225 parts 40% aqueous solution were dissolved in 300 parts of acetone. 152 parts carbon disulfide (2 moles) were added at a temperature of 20° to 25° C. The addition proceeded with the liberation of heat. 60 parts formaldehyde (2 moles) in the form of 162 parts of commercial 37% aqueous solution were added gradually during one-half hour at 10° C. To this solution were added 60 parts of urea (1 mole) and the mixture was stirred to dissolve the urea. After 2 hours, the solution became turbid, and a white precipitate started to form. The mass was kept for 24 hours at 25° C. and was finally warmed to 45° C. and filtered. The product was similar in yield and quality to the product of Example 2.

The product of this invention is useful for incorporation into soaps and detergents, to produce germicidal cleansing agents. The compound is also useful as disinfectant in anti-perspirants and related deodorant formulations. It is also useful as a vulcanizing agent for rubber, and it possesses rodent repellent properties.

As has already been noted, I have found that unless the mentioned compound is in a state of very high purity, the compositions containing it develop objectionable odors upon storage. Such odors are particularly objectionable in disinfectant soaps, cleansing compositions, anti-perspirants and deodorants. My invention is therefore particularly valuable, because the compound obtained thereby produces disinfectant soaps of high potency, excellent storage stability, and essential freedom of objectionable odors even upon storage for long periods of time.

It will be understood that while the use of exact stoichiometric proportions has been emphasized above as desirable in that it favors the production of a compound of highest purity, minor deviations with respect to the quantity of any particular reactant, say to the extent of $\pm 5\%$ of theory, may be practiced. This is illustrated in Examples 1 and 2 above. Other variations in procedure will be readily apparent to those skilled in this art.

I claim as my invention:

1. A process for producing 1,3-bis(dimethylthiocarbamyl-mercaptomethyl)-urea, which comprises reacting together, at 0° to 60° C., in aqueous medium and in essentially stoichiometric proportions, urea, formaldehyde and a reactant of the group consisting of (1) a mixture of carbon disulfide and dimethylamine, (2) a mixture of carbon disulfide and the dimethylammonium salt of dimethyl dithiocarbamic acid, and (3) a mixture of a water-soluble salt of dimethyl dithiocarbamic acid and an acid adapted to liberate dimethyl dithiocarbamic acid from said salt in aqueous medium, and recovering the reaction product.

2. A process as in claim 1, the aqueous medium being a mixture of water and acetone.

3. A process for producing 1,3-bis(dimethylthiocarbamyl-mercaptomethyl)-urea, which comprises reacting together a mixture of urea, formaldehyde, dimethylamine and carbon disulfide, in the proportion of essentially 1:2:2:2 moles, in a mixture of water and acetone and at a temperature between 0° and 60° C., and recovering the precipitated reaction product.

4. A process for producing 1,3-bis(dimethylthiocarbamyl-mercaptomethyl)-urea, which comprises reacting together a mixture of urea, formaldehyde, the sodium salt of dimethyl dithiocarbamic acid and an acid adapted to liberate dimethyl dithiocarbamic acid from said salt in aqueous medium, in the proportion of essentially 1:2:2:2 moles, in an aqueous medium, at a temperature between 0° and 60° C. and while maintaining the reaction mixture at above pH 7, and recovering the precipitated reaction product.

5. A process for producing 1,3-bis(dimethylthiocarbamyl-mercaptomethyl)-urea, which comprises reacting together a mixture of urea, formaldehyde, the dimethylammonium salt of dimethyldithiocarbamic acid and carbon disulfide, in the proportion of essentially 1:2:1:1 moles, in a mixture of water and acetone and at a temperature between 0° and 60° C., and recovering the precipitated reaction product.

6. A process for producing 1,3-bis(dimethylthiocarbamyl-mercaptomethyl)-urea, which comprises reacting together, at 0° to 60° C., urea, formaldehyde, and a reactant of the group consisting of (1) a mixture of carbon disulfide and dimethylamine, (2) a mixture of carbon disulfide and the dimethylammonium salt of dimethyl dithiocarbamic acid, and (3) a mixture of a water-soluble salt of dimethyl dithiocarbamic acid and an acid adapted to liberate dimethyl dithiocarbamic acid from said salt in aqueous medium, said reactants being brought together in such a manner as to avoid contact between urea and formaldehyde except in the presence of at least one of the other reactants above specified, and recovering the precipitated reaction product.

7. A process for producing 1,3-bis(dimethylthiocarbamyl-mercaptomethyl)-urea which comprises reacting together, at 0° to 60° C., urea, formaldehyde, dimethylamine and carbon disulfide, said reactants being brought together in such a manner as to avoid contact between urea and formaldehyde except in the presence of at least one of the other two components above named, and recovering the precipitated reaction product.

References Cited in the file of this patent

UNITED STATES PATENTS

| | | |
|---|---|---|
| 2,068,355 | Sibley | Jan. 19, 1937 |
| 2,496,941 | Hardman | Feb. 7, 1950 |